(12) United States Patent
Shiota et al.

(10) Patent No.: US 6,185,000 B1
(45) Date of Patent: Feb. 6, 2001

(54) METHOD AND APPARATUS FOR INSTRUCTING PRINTING OF RECORDED INFORMATION ON PICTURE IMAGE PRINTS, AND PROGRAM RECORDED MEDIUM USED THEREFOR

(75) Inventors: Kazuo Shiota, Tokyo; Norihisa Haneda, Saitama-ken; Shigekazu Fukada, Tokyo, all of (JP)

(73) Assignee: Fuji Photo Film Co., Ltd., Kanagawa-ken (JP)

( * ) Notice: Under 35 U.S.C. 154(b), the term of this patent shall be extended for 0 days.

(21) Appl. No.: 08/997,089

(22) Filed: Dec. 23, 1997

(30) Foreign Application Priority Data

Dec. 24, 1996 (JP) .................................................. 8-342875

(51) Int. Cl.⁷ ............................. B41B 15/00; B41J 15/00; G06F 15/00
(52) U.S. Cl. ........................................... 358/1.18; 396/310
(58) Field of Search ........................... 395/117; 396/300, 396/310, 311, 321, 319; 399/1, 2, 361; 345/435; 707/527, 530

(56) References Cited

U.S. PATENT DOCUMENTS

| | | | |
|---|---|---|---|
| 4,888,648 | * 12/1989 | Takeuchi et al. | 386/52 |
| 5,023,635 | * 6/1991 | Nealon | 396/311 |
| 5,592,305 | 1/1997 | Iwadate et al. | 358/448 |
| 5,608,540 | 3/1997 | Krahe et al. | 358/449 |
| 5,649,247 | * 7/1997 | Itoh et al. | 396/311 |
| 5,706,457 | * 1/1998 | Dwyer et al. | 395/349 |
| 5,835,465 | * 11/1998 | Yachida | 369/54 |

* cited by examiner

Primary Examiner—Joseph Mancuso
Assistant Examiner—F. E. Cooperrider

(57) ABSTRACT

A user takes in digital image data and photographing information added thereto into a personal computer, and instructs, on a printing instruction screen, a printing format such as whether or not the photographing information should be printed and where the photographing information is to be printed. The content of the instruction is added to the digital image data as printing information and transferred to a printer via a recording medium, for example. The printer prints the photographing information on a picture print based on the printing information when the picture print is generated.

29 Claims, 1 Drawing Sheet

METHOD AND APPARATUS FOR INSTRUCTING PRINTING OF RECORDED INFORMATION ON PICTURE IMAGE PRINTS, AND PROGRAM RECORDED MEDIUM USED THEREFOR

BACKGROUND OF THE INVENTION

1. Field of the Invention

The present invention relates to a method for printing digital picture image data obtained by picture image recording, a picture printer used for carrying out the method, and a recording medium recorded with a program used for the method.

2. Description of the Related Art

Heretofore, in the APS (Advanced Photo System), photographing information such as the date of photographing has been recorded magnetically on a film upon photographing a picture image. The magnetically recorded photographing information has been read and added to digital image data as tag information upon obtaining the digital image data of the picture image by reading the film. Furthermore, in the case of a digital camera, photographing information (hereinafter referred to as "recording information") has been added to digital image data and stored in a memory of the digital camera upon recording the digital image data obtained by picture image recording.

The above recording information has been printed on the back of a picture print for example, and used for managing or ordering prints. However, what kind of recording information is printed, and on which part of a picture print the printing takes places, has been determined rigidly by a function of a camera or a laboratory system, or by giving a detailed oral instruction upon ordering a picture print.

A variety of needs must be considered regarding the format of recording information print. For example, in the case of a picture for us in a photo contest, recording information printing is generally not desired on the surface of the picture print. In another case, printing of not only the date of recording and a title, but also recording conditions such as lens data or exposure may be desired. For such reasons, it is obviously inconvenient that items to be printed on a picture print or positions thereof are fixed, or desired printing format is not obtained unless a detailed instruction for each frame is provided. Therefore, a method to easily instruct a printing format is needed.

SUMMARY OF THE INVENTION

Based on consideration of the above problems, an object of the present invention is to provide a picture image printing method which can easily instruct a format for printing recording information on a picture print.

The picture image printing method of the present invention comprises the steps of obtaining digital image data to which recording information of picture image recording is added upon recording the picture image, displaying the recording information which has been added to the digital image data as well as the digital image data on a printing instruction screen, instructing a printing format of the recording information on the printing instruction screen, adding printing information which represents the instructed printing format as well as the recording information to the digital image data, and printing the recording information on a picture print based on the printing information which has been added to the digital image data upon reproducing the digital image data as the picture print.

"The recording information" refers to information such as the date of recording, the title of a picture, the lens focal length, the lens F value, the content of AE processing carried out by a camera, the focusing length, the focusing position, a lighting condition, whether or not flash has been used, and weather if the picture image has been recorded outside. Since what kind of recording information is added to digital image data depends on a function of a camera or the like, it is not limited specifically.

Furthermore, display of the recording information on the printing instruction screen is carried out to enable a user to provide a printing instruction. Therefore, only item name display such as "the date of recording" may be sufficient without displaying the actual content of the recording information such as "December 24th".

"The printing format of the recording information" means whether or not the recording information should be printed, a position on a picture print at which the recording information is printed, a method of printing, direction of printing (vertical or horizontal), the size or font of characters or the like. In this specification, as one form of the "printing format instruction", "no printing" instruction is intended to be included.

It is preferable to instruct the printing format for each item when the recording information is composed of a plurality of items among the above recording information items.

A picture printer of the present invention is a picture printer used in the above printing method, whereby the digital image data, to which the printing information and the recording information is added, is reproduced as a picture print and the recording information is printed on the picture print based on the printing information, that is, the printing format a user has instructed.

A recording medium in which a program of the present invention is recorded is a recording medium in which a program used for instructing the printing format in the above printing method is stored. By distributing these recording media to users who request prints, the users can easily instruct printing by using their computer. The program makes a computer display the printing instruction screen on a display apparatus which is connected to the computer, enable an instruction of the printing format on the printing instruction screen by using a variety of input devices of the computer, and add the printing information representing the instructed printing format as well as the recording information to the digital image data, and store them in a predetermined recording medium.

The printing information which a user has generated by using a personal computer or the like may be handed to a DPE Development Print and Enlargement or the like (including any shop or place which develops film, prints images, or enlarges images or prints such as a DPE, as they are known in Japan, and a mini-photolab as they are known in the U.S.) by storing the printing information in a floppy disc or the like, or may be transferred via a network.

According to the picture image printing method of the present invention, a user takes in digital image data and the recording information which has been added thereto into his/her personal compute or the like, and instructs, on the printing instruction screen, a printing format such as whether or not the recording information should be printed and positions of the recording information print. The content of the instruction is added to the digital image data as the printing information, and handed to a picture printer via a recording medium for example. The picture printer carries out printing of the recording information on a picture print based on the printing information when a picture print is generated. In other words, according to the present method, a picture printer can print the recording information in a format in accordance with the intention of a user.

In the case of the recording information composed of a plurality of items such as the date of recording and a title, if a position at which the item is printed on a picture print or whether or not the item should be printed is specified for each item, printing of the recording information can be carried out reflecting a user's need in a more desirable manner.

The picture printer used for generating a picture print by using the above method prints the recording information on a picture print based on the printing information representing the printing format instructed by a user. Therefore, a user only has to hand in a medium in which the printing information is recorded to a DPE when he/she instructs the printing format. In this manner, not only a user but also a service provider can improve efficiency when ordering a print.

According to the recording medium in which the program used for instructing the printing format in the above method is recorded, by installing the program into a personal computer or the like of a user, the user can instruct the printing format remaining at home. Therefore, the user can take sufficient time to determine a desired printing format. Furthermore, the content of the printing format instructed by a user by using this program is stored in a recording medium as printing information in a data format which can be recognized by a picture printer. Therefore, the recording information printing format can be easily instructed by only handing in the medium when a print is requested.

DESCRIPTION OF THE PREFERRED EMBODIMENT

Figure 1:
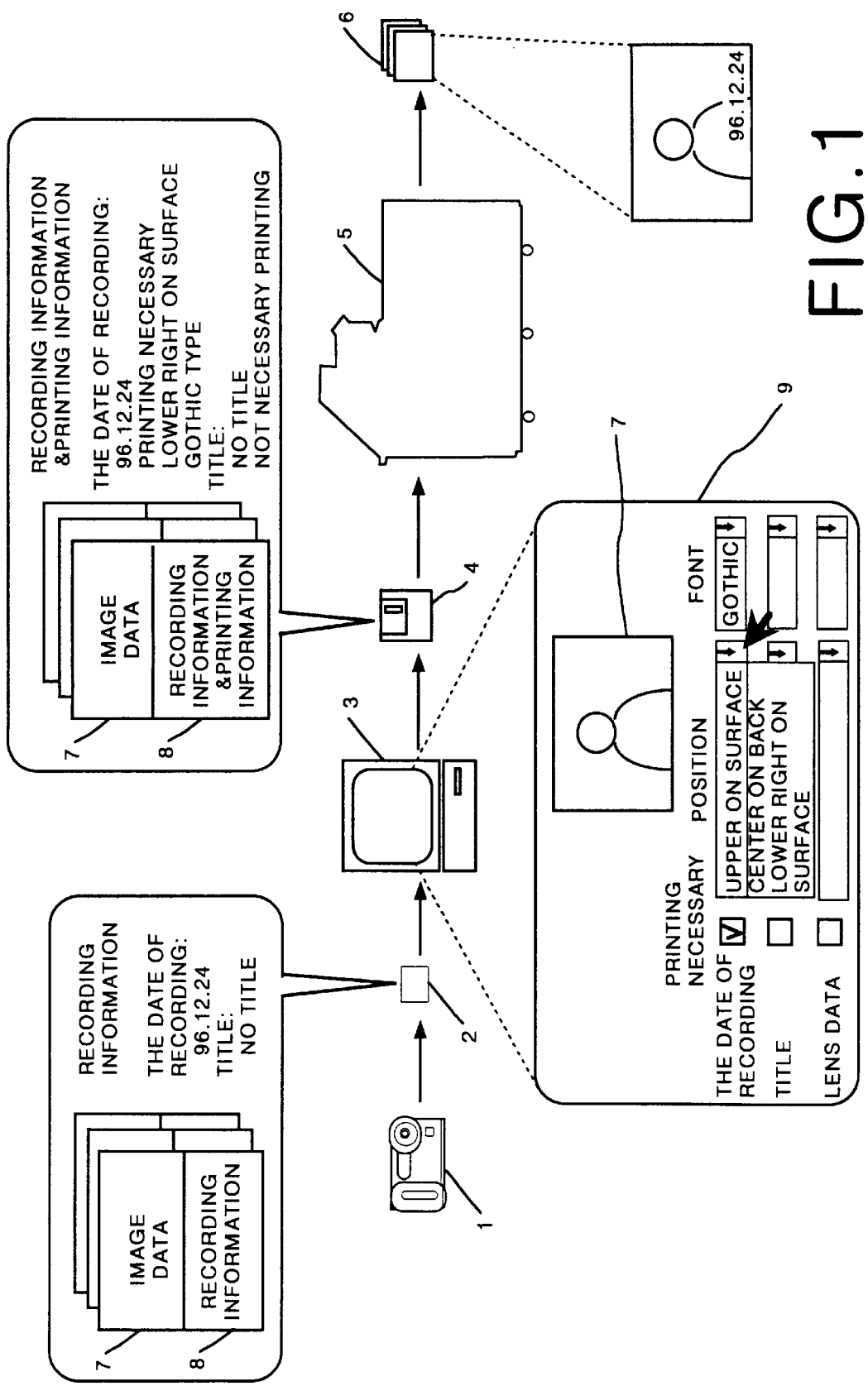
FIG. 1 is a diagram showing an embodiment of a picture image printing method of the present invention.

Hereinafter, an embodiment of the present invention will be explained referring to the accompanying drawing. FIG. 1 is a diagram showing the case where a picture image recorded by a digital camera is printed according to the method of the present invention.

A digital camera 1 is a camera whereby image data 7 obtained by recording are stored in a memory card 2. The digital camera 1 has a function by which a photographer can set the date of recording or the title of a picture upon recording. The information set by the photographer is added to the image data 7 as recording information 8. On this occasion, only the date of recording which has been set may be added as the recording information 8, or all items including the items which have not been specified by the photographer may be added as the recording information 8. However, in this case, the information showing no specification is added to the items which have not been specified.

The image data and the recording information 8 recorded in the memory card 2 can be input to a personal computer 3 or the like by transferring the image data and recording information directly by using a card reader or indirectly via another medium. A program of the present invention stored in a recording medium is installed in the personal computer 3. In this manner, the printing format of the recording information can be instructed.

The above program displays a printing instruction screen 9 such as shown in FIG. 1 on a monitor of the personal computer 3. On the printing instruction screen, the image data whose recording information printing is being instructed and each item of the recording information 8 added to the image data 7 are displayed. Since only the printing format is instructed, the content of the recording information such as December 24th may not necessarily be displayed. On the printing instruction screen 9, whether or not printing is necessary, the position at which printing is carried out, and the font of characters can be specified for each item. This instruction may be carried out by displaying check boxes or selection menus as shown in FIG. 1, and by checking or selecting a menu by a mouse, for example. In FIG. 1, the case where a photographer instructs printing of only the date of recording is shown as an example. Any known user interface can be used as the means for instruction.

The content of the instruction specified by using the printing instruction screen 9 is added to the image data 7 as printing information together with the recording information, and stored in a hard disc of the personal computer 3 or a medium such as a floppy disc or an MO (magneto-optic) disc. The recorded image data 7, the recording information, and the printing information may be transferred to a DPE or the like via a medium such as an MO disc 4 as shown in FIG. 1, or via a network if the personal computer 3 and a picture printer 5 are connected to the network.

The picture printer outputs the image data 7 as a picture print 6. On this occasion, the picture printer reads not only the image data 7 but also the recording information and the printing information, and prints the date of recording in the lower right corner of the picture print surface in Gothic type according to the printing information, in the case of the example shown in FIG. 1.

The instruction of the printing format on the printing instruction screen 9 may be carried out for each frame as shown in FIG. 1, or may be carried out collectively for a plurality of frames. As the printing format which can be used, a variety of content in addition to the above examples is considered. The content may include a printing method such as whether characters are typed or printed as a portion of the image, a direction of printing such as whether a title or the like is printed vertically or horizontally, and the size of the characters.

In the form where image data are stored in a system installed in a DPE, such as in the Internet photo service, and a user orders a print by accessing a server computer of the system, the printing instruction screen 9 may be set as one of the screens displayed by a browser, and image data stored in the laboratory system may be printed by automatically transferring the printing information to the laboratory system after printing instruction has been carried out on the printing instruction screen.

Since the present invention relates to the printing method which is used when image data to which recording information has been added are printed, a method for obtaining such image data is not especially limited herein. In other words, the image data such as the above may be obtained by not only a digital camera but also by carrying out recording using a film camera and adding the recording information as a portion of data to image data upon reading a film. In the APS, since the recording information is magnetically recorded on a film, the recording information can be added to image data by reading the recording information by using a laboratory system. Alternatively, the image data obtaining method may include the case where the recording information is added to image data obtained from a 35 mm film by separately inputting the recording information using an input device such as a keyboard or the like.

What is claimed is:

1. A picture image printing method comprising the steps of:
   obtaining digital image data to which recording information has been added upon recording a picture image;
   displaying the recording information having been added to the digital image data on a printing instruction screen together with the digital image data,
   wherein the displayed recording information includes information which is typically selected for printing along with the digital image data, and information which is not typically printed with the digital image data,
   wherein said typically printed recording information includes at least one of a date of recording and a title of the picture image, and said recording information not typically printed includes at least one of lens data and exposure data, and
   wherein said typically printed recording information is mutually exclusive from said recording information not typically printed;
   instructing a printing format and the recording information to the digital image data;
   adding printing information showing the instructed printing format and the recording information to the digital image data; and
   printing the recording information on a picture print based on the printing information added to the digital image data when the digital image data are reproduced as the picture print,
   wherein the user has the option to de-select the printing of information typically printed along with the digital image data, and to select the information which is not typically printed with the digital image data.

2. A picture image printing method as defined in claim 1 wherein whether or not the recording information should be printed on the picture print is specified in the instructing of the recording information printing format.

3. A picture image printing method as defined in claim 1 wherein a position on the picture print, at which the recording information is printed, is specified in the instructing of the recording information printing format.

4. A picture image printing method as defined in claim 1, wherein
   the recording information includes a plurality of items; and
   the instructing of the recording information printing format is carried out for each of the plurality of items.

5. A picture printer for performing the picture image printing method as defined in claim 1, whereby
   the printing information and the digital image data to which the recording information has been added are reproduced as a picture print, and the recording information is printed on the picture print based on the printing information.

6. A recording medium in which a program used for executing the picture image printing method as defined in claim 1 is recorded, wherein the program enables a computer to:
   display the printing instruction screen on a display apparatus of the computer;
   instruct the printing format on the printing instruction screen by using one of a plurality of input devices of the computer; and
   add the printing information showing the instructed printing format and the recording information to the digital image data and to record the printing information, recording information and the digital image data in a predetermined recording medium.

7. A recording medium of claim 6, whereby the program further enables the computer to instruct whether or not the recording information should be printed upon instructing the printing format.

8. A recording medium of claim 6, whereby the program further enables the computer to instruct the position on the picture print at which the recording information is printed upon instructing the printing format.

9. A recording medium of claim 6, whereby
   the recording information includes a plurality of items; and
   the program further enables the computer to instruct the printing format for each of the plurality of items.

10. The picture image printing method of claim 1, wherein the recording information includes information recorded with a captured picture image.

11. The picture image printing method of claim 1, wherein the recording information further includes at least one of a focal length of a lens that captured a picture image and lighting conditions when a picture image is captured.

12. The picture image printing method of claim 10, wherein the recording information includes at least one of a date that a picture image is captured, a title of a picture image, a focal length of a lens that captured a picture image, and lighting conditions when a picture image is captured.

13. A recording medium of claim 6, wherein the recording information further includes at least one of a focal length of a lens that captured a picture image and lighting conditions when a picture image is captured.

14. A picture image printing method comprising:
   displaying recording information, recorded with a captured image, along with digital image data of the image,
   wherein the displayed recording information includes information which is typically selected for printing along with the digital image data, and information which is not typically printed with the digital image data,
   wherein said typically printed recording information includes at least one of a date of recording and a title of the picture image, and said recording information not typically printed includes at least one of lens data and exposure data, and
   wherein said typically printed recording information is mutually exclusive from said recording information not typically printed;
   prompting selection among the displayed recording information for printing with the digital image data; and
   printing only selected recording information and digital image data together as a picture print,
   wherein the user has the option to de-select the printing of information typically printed along with the digital image data, and to select the information which is not typically printed with the digital image data.

15. The picture image printing method of claim 14, wherein the selecting step further comprises prompting selection of whether or not each displayed recording information is to be printed together with the digital image data.

16. The picture image printing method of claim 14, further comprising:
   prompting selection of a position for printing selected recording information, relative to the digital image data.

17. The picture image printing method of claim 15, further comprising:

prompting selection of a position for printing selected recording information, relative to the digital image data.

18. The picture image printing method of claim 14, wherein the recording information further includes at least one of a focal length of a lens that captured a picture image and lighting conditions when a picture image is captured.

19. A computer readable medium comprising:

first code segment for causing a computer to display recording information, recorded with a captured image, along with digital image data of the image, wherein the displayed recording information includes information which is typically selected for printing along with the digital image data, and information which is not typically printed with the digital image data, wherein said typically printed recording information includes at least one of a date of recording and a title of the picture image, and said recording information not typically printed includes at least one of lens data and exposure data, and wherein said typically printed recording information is mutually exclusive from said recording information not typically printed;

second code segment for causing the computer to prompt selection among the displayed recording information for printing with the digital image data; and third code segment for causing the computer to print only selected recording information and digital image data together as a picture print, wherein the user has the option to de-select the printing of information typically printed along with the digital image data, and to select the information which is not typically printed with the digital image data.

20. The computer readable medium of claim 19, further comprising:

a fourth code segment for causing the computer to prompt selection of whether or not each displayed recorded information is to be printed together with the digital image data.

21. The computer readable medium of claim 19, further comprising:

a fourth code segment for causing the computer to prompt selection of a position for printing selected recording information relative to the digital image data.

22. The computer readable medium of claim 20, further comprising:

a fifth code segment for causing the computer to prompt selection of a position for printing selected recording information relative to the digital image data.

23. The computer readable medium of claim 19, wherein the medium is a magneto-optic disk.

24. The recording medium of claim 6, wherein the medium is a magneto-optic disk.

25. A picture image printing apparatus, comprising:

a display, adapted to display recording information, recorded with a captured image, along with digital image data of the image, wherein the displayed recording information includes information which is typically selected for printing along with the digital image data, and information which is not typically printed with the digital image data, wherein said typically printed recording information includes at least one of a date of recording and a title of the picture image, and said recording information not typically printed includes at least one of lens data and exposure data, and wherein said typically printed recording information is mutually exclusive from said recording information not typically printed;

an input device, adapted to select among the displayed recording information for printing with the digital image data; and a printer, adapted to print only selected recording information and digital image data together as a picture print, wherein the user has the option to de-select the printing of information typically printed along with the digital image data, and to select the information which is not typically printed with the digital image data.

26. The picture image printing apparatus of claim 25, wherein the input device is further adapted to select whether or not each displayed recording information is to be printed together with the digital image data.

27. The picture image printing apparatus of claim 25, wherein the input device is further adapted to select a position for printing selected recorded information, relative to the digital image data.

28. The picture image printing apparatus of claim 26, wherein the input device is further adapted to select a position for printing selected recorded information, relative to the digital image data.

29. The picture image printing apparatus of claim 25, wherein the recording information further includes at least one of a focal length of a lens that captured a picture image and lighting conditions when a picture image is captured.

* * * * *